United States Patent [19]
Connelly

[11] 3,765,366
[45] Oct. 16, 1973

[54] FLOATING BOAT FENDER
[76] Inventor: Robert Connelly, 3158 N.E. 78th Ave., Portland, Oreg. 97213
[22] Filed: Feb. 9, 1972
[21] Appl. No.: 224,826

[52] U.S. Cl. ............................................... 114/219
[51] Int. Cl. ............................................. B63b 59/02
[58] Field of Search .......................... 114/219; 9/8 R

[56] References Cited
UNITED STATES PATENTS

| | | | |
|---|---|---|---|
| 2,960,055 | 11/1960 | Tomek | 114/219 |
| 3,286,680 | 11/1966 | Caretta | 114/219 |
| 3,084,354 | 4/1963 | Lünenschloss | 9/8 R |
| 3,292,566 | 12/1966 | Russell | 114/219 |
| 3,464,071 | 9/1969 | Starratt | 9/8 R |

Primary Examiner—Milton Buchler
Assistant Examiner—Gregory W. O'Connor
Attorney—Stephen W. Blore et al.

[57] ABSTRACT

A hollow tubular boat fender of rubber or the like has one end reduced in diameter and provided with a hole for attaching a cord. A buoyant structure is positioned in such end of the fender. Holes extend through the wall of the fender between the buoyant structure and the other end of the fender as well as an opening in such other end so that any space in the fender rapidly fills with water when the fender is placed in water. The fender floats in an upright position with its cord attaching end above the surface of the water. A portion of the buoyant structure can be movable to a position adjacent such other end of the fender by cords or a flexible rod extending to the exterior of the body portion so that the fender then floats in a horizontal position.

4 Claims, 7 Drawing Figures

PATENTED OCT 16 1973
3,765,366
FIG. 1   FIG. 2   FIG. 4
FIG. 5
FIG. 6
FIG. 3
FIG. 7
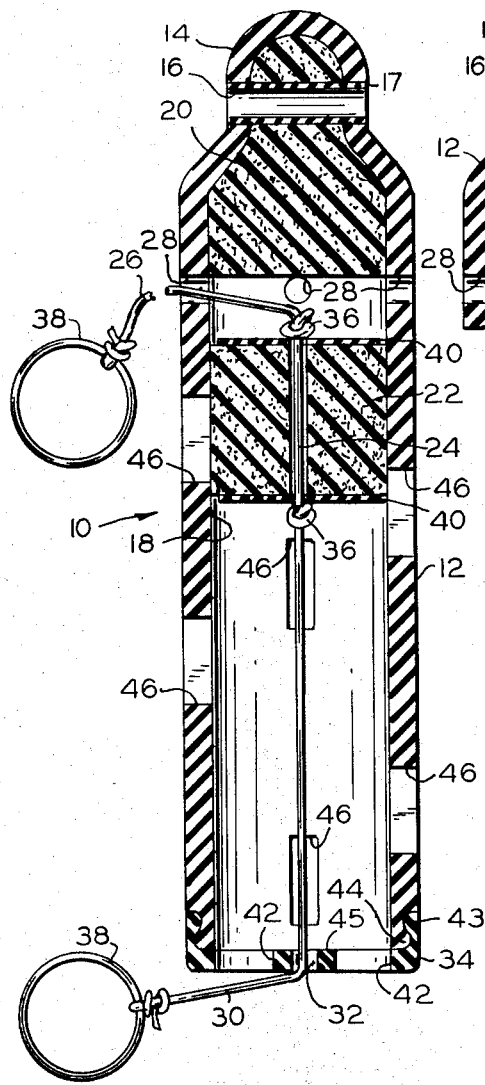
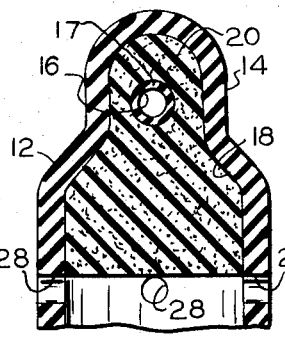
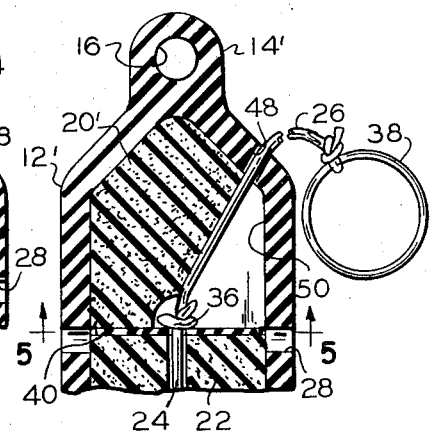
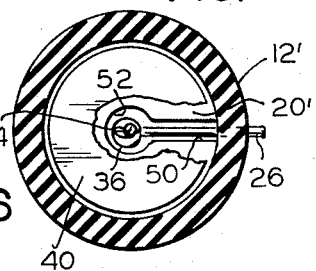
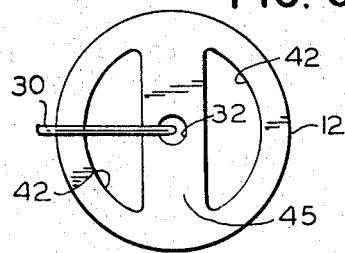
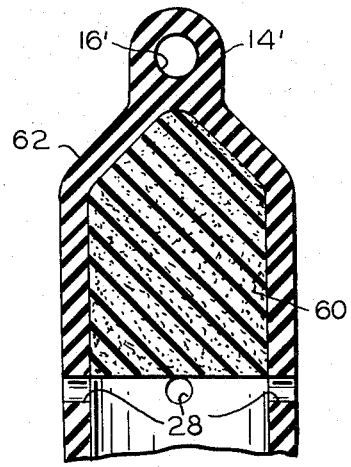

FLOATING BOAT FENDER

BACKGROUND OF THE INVENTION

Tubular boat fenders have been proposed, for example, the fender shown in Tomek Pat. No. 2,960,055 in which an opening for venting air from the interior of the fender is in a reentrant portion extending inwardly from one end of the fender to also provide an open air pocket in which air is trapped to provide buoyancy. This opening also receives the two ends of a cord loop. These ends are tied in a knot in the interior of the fender, the knot being bigger than the opening through the reentrant portion. The air can be easily lost from the open air pocket shown if the fender is rocked by wave motion, and the fender then sinks. Even if such open air pocket is replaced by a light water displacing medium as suggested in the Tomek patent, the long narrow opening in the reentrant portion can become plugged with dirt or other extraneous matter in which case air can be trapped in the body of the fender to cause the fender to float in an upside down position.

SUMMARY OF THE INVENTION

The fender of the present invention has a buoyant structure in one end of a resilient tubular body and also has a plurality of air venting and water admitting holes through its tubular wall between the buoyant structure and the other end of the fender as well as an opening in such other end. In any position of the fender in the water, any air in the fender immediately escapes and is replaced by water so that it assumes a position determined by the buoyancy of the buoyant structure.

When a boat is moored against a horizontal structure such as a wall or the like, the preferred position of the fender is one in which its longitudinal axis extends vertically. In such case the buoyant structure should be in the end of the fender which receives the attaching or connecting cord or rope, so that the fender will float in a vertical position at the surface of the water.

When the boat is moored against a vertical extending member such as piling or the like, the preferred position of the fender is one in which its longitudinal axis is horizontal. In the preferred embodiment of the present invention, a part of the buoyant structure can be manually moved to the other end of the fender so that the fender floats with its axis horizontal. In all cases openings through the tubular wall of the fender are provided so that any space in the chamber not occupied by the buoyant structure is rapidly filled with water.

BRIEF DESCRIPTION OF THE DRAWINGS

FIG. 1 is a longitudinal section through a fender in accordance with the present invention;

FIG. 2 is a fragmentary vertical section of one end of the fender of FIG. 1 taken at right angles to the section of FIG. 1;

FIG. 3 is a bottom plan view of the fender of FIG. 1;

FIG. 4 is a view similar to FIG. 2 showing a modified fender;

FIG. 5 is a lateral section taken on line 5—5 of FIG. 4;

FIG. 6 is a longitudinal section through a modified movable buoyant element for the fenders of FIGS. 1 and 2; and FIG. 7 is a view also similar to FIG. 2 showing a further modified fender.

DESCRIPTION OF A PREFERRED EMBODIMENT

The fender 10 of FIG. 1 has an elongated tubular body member 12 made of resilient material, such as natural rubber or a synthetic rubber or a resilient plastic material. The body member is preferably a cylinder which is round in lateral cross section but can have a lateral cross section of any other suitable shape. One end of the body portion 12 terminates in a connecting portion 14 of reduced diameter which has a hole 16 extending therethrough for receiving a flexible connecting member, such as a cord or rope (not shown), the hole being in a resilient tubular member extending through the portion 14.

The cylindrical wall of the body member provides an internal chamber 18 in which is positioned a buoyant structure including a stationary buoyant element 20 and a movable buoyant element 22. The stationary buoyant element 20 is positioned at the connecting end 14 of the body member 12 so as to extend into the reduced portion of such body member around the hole 16.

The movable buoyant element 22 is longitudinally slidable in the chamber 18, for example, by manual actuation of a cord 24 extending through a hole in the buoyant element 22, and having an end 28 in the wall of the body member adjacent the buoyant element 20 and another end 30 extending through a hole 32 in an end member 34 for the body member 12. The cord 24 may have knots 36 at each end of the buoyant member 22 and may have rings 38 attached to its ends. It will be apparent that pulling on the end 30 of the cord 24 will slide the movable buoyant element 22 in the chamber 18 to the other end of the body member, i.e. to the end remote from the reduced portion 14, and that the movable buoyant element can be returned to the position shown in FIG. 1 by pulling on the end 26 of the cord 24.

The buoyant members are preferably made of a resilient porous material, such as sponge rubber or foamed resilient plastic having closed air cells. If necessary, the ends of the movable buoyant element 22 may be protected by washers 40, made of relatively stiff resilient rubber or plastic material, to prevent damage to the buoyant element by the cord 24. It is possible to form the stationary buoyant element 20 within the end 14 of the fender or as a separate element which is then inserted into the chamber 18 and adhesively secured therein. The movable buoyant element 22 will however be made as a separate element and inserted into the chamber 18 in the body member 12 before the end member 34 is positioned on the body member. Either or both of the buoyant elements may alternatively be sealed hollow elements containing air or other gas.

The end member 34 is provided with holes 42 for the entrance of water or exhausting of air when the fender is placed in water. The end member 34 is removably held in position on the body portion 12 by a flange 43 engaging a similar flange 44 on the body member in interlocking relation. The holes 42 leave a strap or bar 45 of the resilient material of the end member 34. This strap 45 contains the hole 32 for the cord end 30.

The body portion of the fender is provided with a plurality of the holes 28 around its circumference and also has a plurality of elongated holes or slots 46 distributed circumferentially and axially of the body portion 12 so that water is freely admitted into and air exhausted from any space in the fender including that between the buoyant elements 20 and 22 through the holes 28, 42 or 46, no matter what the position of the movable buoyant element 22 when it is placed in water. The result is that substantially no air is trapped in any of such spaces and the fender floats in the position shown in FIG. 1 with its longitudinal axis vertical, when the movable buoyant element 22 is adjacent the buoyant element 20, and always floats with its longitudinal axis in a horizontal position when the movable buoyant element is in the other end of the fender unless the fender is restrained from doing so by some externally applied force.

A modified fender structure is shown in FIG. 4 in which the upper end 26 of the cord 24 extends to the exterior of the fender through a hole 48 in a body member 12' adjacent a modified connecting portion 14' having a hole 16' for receiving a connecting cord or rope. A stationary buoyant element 20' may have a narrow slot 50 and hollow portion 52 for receiving the upper end 26 of the cord 24 and the upper knot 36 in the cord, respectively. This structure enables the movable buoyant element 22 to be pulled closer to the stationary buoyant element 20'.

A modified structure for moving the buoyant element 22 is shown in FIG. 6. In this figure the buoyant element 22 is shown as being mounted on a rod 54 of resilient rubber or plastic and held in position by pins 56 extending through the rod. It will be apparent that the rod 54 can extend through the hole 32 in the strap 45 of the end member 34 for the body portion 12 of FIG. 3, a knob 58 being shown on the end of the rod remote from the movable buoyant element 22 to facilitate manual manipulation of the rod 54 to move the buoyant element 22 endwise of the fender. It will be apparent that the buoyant element 22 of either FIGS. 1 or 6 may fit sufficiently loosely in the body of the fender that lowering of the fender vertically into water by a cord or rope attached to the portion 14 will cause the buoyant element to float to the uppermost end of the fender unless deliberately held at the other end of the fender. The fender is thus automatically caused to float with the portion 14 uppermost.

A further modified fender having a single buoyant element 60 of greater volume than any of the buoyant elements 20, 22 or 22' described above is shown in FIG. 7. The body member 62 of this modification is shown as being similar to the body member 12' of FIGS. 4 and 5, except that the holes 28 are positioned further from the end 14' of reduced diameter and no hole 48 is provided since no movable buoyant element 22 is present. It will be understood, however, that the body member 62 of FIG. 5 as well as the body member 12' of FIGS. 4 and 5 will be provided with holes or slots 46 extending through the wall of the body member, in addition to the holes 28, so that any spaces in the body member will rapidly fill with water when the fender is positioned in water. The fender of FIG. 7 will quickly assume a floating position in the water with its longitudinal axis vertical. A single buoyant element similar to the buoyant element 60 of FIG. 7 can also be employed in the body portion 12 of the fender 10 of FIG. 1 by suitably shaping such body element to fit the interior of the reduced end 14 of FIGS. 1 and 2.

I claim:

1. A boat fender comprising:

an elongated resilient tubular body member terminating at one end in a connecting portion having a hole therethrough for receiving a connecting element;

said body member being of greater density than water and providing an elongated chamber in its interior and having an opening into said chamber at the other end of said body member;

first buoyant means positioned within said chamber adjacent said one end of said body member for causing said fender to float in water in an upright position with said one end of said body member above the surface of the water when the remaining portion of said chamber is filled with water;

second buoyant means positioned within said chamber and movable between a position adjacent said first buoyant means and a position adjacent said other end of said body member for causing said fender to float in water in a horizontal position when adjacent said other end, said body member having openings extending outwardly from said chamber through the wall of said chamber adjacent said first buoyant means and between said second buoyant means and said other end of said body member for causing said chamber to fill with water without trapping substantial amounts of air in said chamber when said fender is placed in water.

2. The boat fender of claim 1 further including:

moving means secured to said second buoyant means and extending from said chamber to the exterior of said fender for moving said second buoyant means within said chamber.

3. The boat fender of claim 2 in which:

said moving means includes a first flexible connector element secured to said second buoyant means and extending through an opening in said other end of said body member and a second flexible connector element secured to said second buoyant means and extending through an opening in said body member at a position adjacent said first buoyant means.

4. The boat fender of claim 2 in which:

said moving means includes a flexible rod having one end secured to said second buoyant means and its other end extending through an opening in said other end of said body member.

* * * * *

PO-1050
(5/69)

UNITED STATES PATENT OFFICE
CERTIFICATE OF CORRECTION

Patent No. 3,765,366          Dated October 16, 1973

Inventor(s) Robert Connelly

It is certified that error appears in the above-identified patent and that said Letters Patent are hereby corrected as shown below:

Column 2, line 24, after "end" insert --26 extending to the exterior of the body member 12 through a hole--.

Signed and sealed this 9th day of April 1974.

(SEAL)
Attest:

EDWARD M. FLETCHER, JR.
Attesting Officer

C. MARSHALL DANN
Commissioner of Patents